United States Patent [19]

Schultz

[11] 3,763,787

[45] Oct. 9, 1973

[54] CARPET ROLL REINFORCED PROPELLANT AND METHOD FOR MAKING

[75] Inventor: Seiford F. Schultz, Huntsville, Ala.

[73] Assignee: The United States of America as represented by the Secretary of the Army

[22] Filed: Feb. 11, 1971

[21] Appl. No.: 114,708

[52] U.S. Cl.................................. 102/100, 60/255
[51] Int. Cl.............................................. F42b 1/00
[58] Field of Search.................. 102/100, 101, 49.3, 102/49.4, 49.5, 49.6, 49.7, 39; 60/253, 256

[56] References Cited
UNITED STATES PATENTS

| 3,067,686 | 12/1962 | Coover, Jr. et al. | 102/101 |
| 3,316,842 | 5/1967 | Schultz | 102/100 |
| 3,159,104 | 12/1964 | Hodgson | 102/101 |

Primary Examiner—Robert F. Stahl
Attorney—Harry M. Saragovitz, Edward J. Kelly, Herbert Berl and James T. Deaton

[57] ABSTRACT

A composite or modified double base propellant that is reinforced with a substrate material and suspended in a rocket motor case from the head end of the propellant by bonding the propellant to the motor case. The substrate material is fabricated into the propellant composition by being incorporated in a carpet roll fabrication. Applicant's reinforced propellant is therefore applicable for use in a high pressure, short duration eject motor which requires a high acceleration load capability.

2 Claims, 3 Drawing Figures

PATENTED OCT 9 1973 3,763,787

Seiford F. Schultz,
INVENTOR.

BY Harry M. Saragovitz
Edward J. Kelly
Herbert Berl
James T. Deaton

CARPET ROLL REINFORCED PROPELLANT AND METHOD FOR MAKING

CROSSREFERENCE TO RELATED APPLICATIONS

This application is related to applications Ser. No. 102,313, filed Dec. 29, 1970 and to application Ser. No. 103,550, filed Jan. 4, 1971.

BACKGROUND OF THE INVENTION

The present state of the art composite or modified double base propellant grains lack the ultra high burning rate required for short duration motors (under 7 microseconds) and the strength to withstand acceleration forces in the 6,000+ g range. Utra high burning rate propellants are needed in weapon systems using a free flight, line of sight rocket which requires higher velocities to increase the range and potential kill probability. The increased velocity can be obtained by the use of a high pressure motor utilizing a grain which has a high surface to mass ratio, which has the ability to withstand high acceleration forces, and which has the ability to maintain its structural integrity until after burnout.

Therefore, it is an object of this invention to utilize conventional propellants in high thrust short duration motors.

Another object of this invention is the adaptation of conventional composite or modified double base propellant compositions to thin webbed grains for short duration motors.

Further object of this invention is to provide a propellant that is reinforced throughout burning.

Still another object of this invention is to provide a propellant grain that has good adhesion of the propellant to the substrate.

A still further object of this invention is to provide a propellant that has the capability of withstanding high acceleration.

Still another object of this invention is to provide a propellant that has higher loading density than state of the art propellant systems and large surface to mass ratio.

Still another object of this invention is to provide a propellant grain that has low temperature sensitivity.

SUMMARY OF THE INVENTION

In accordance with this invention a composite or modified double base propellant is applied to opposite sides of a screen type reinforcing material to provide a sheet that can be cut to the desired length and width and rolled into a carpet roll propellant grain. The carpet roll grain produced is secured in the propellant motor case from the head end by being bonded to a head end plate. This structure produces a rocket motor that has a propellant with large surface to mass ratio, a propellant that has higher loading density than state of the art propellant grain configurations, a propellant that has high acceleration capability, a propellant that has reinforcement throughout burning of the propellant, and a propellant that has low temperature sensitivity. Therefore, this rocket motor has the capability of operating as a high pressure, short duration eject motor which requires a high acceleration load capability.

DETAILED DESCRIPTION OF THE INVENTION

Figure 1:
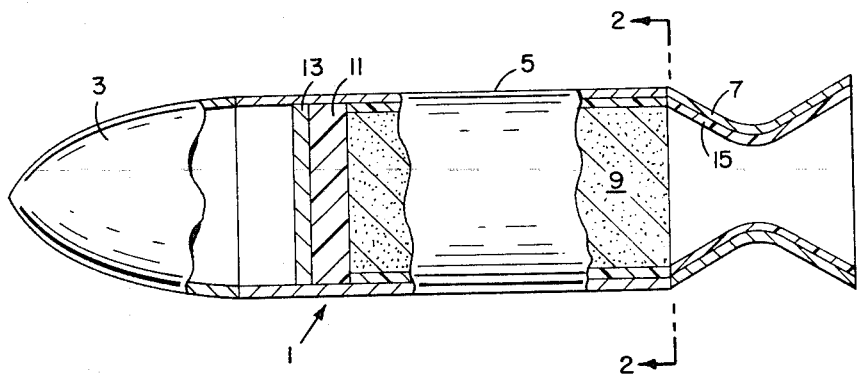
FIG. 1 is a side view of a rocket according to this invention with portions thereof cut away and shown in section.
Figure 2:
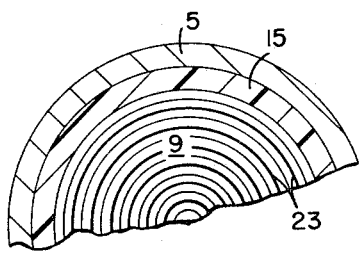
FIG. 2 is a section taken along line 2—2 of FIG. 1 with a portion thereof broken away and showing the propellant structure on an enlarged scale.

Referring now to FIG. 1, rocket 1 is shown that has forward section 3 and rear motor section 5. Motor section 5 has exhaust nozzle 7 and propellant 9 secured within the motor case. Propellant 9 is secured in position at the head end thereof by bonding means 11 that secures the propellant to head end plate 13. For greater details of the bonding means 11 see copending application Ser. No. 102,313, filed Dec. 29, 1970. Head end plate 13 is secured to the motor case in a conventional manner to securely mount the propellant in the motor case. The motor case may be provided with insulation 15 if desired. Solid propellant 9 is made in a carpet roll form and is comprised of inner and outer propellant layers 17 and 19 (see FIG. 3) that are mounted on a substrate material 21 such as fiberglass screen. Screen 21 may have a burning inhibiter thereon if desired. When rolled into the carpet roll, the surfaces of propellant layers 17 and 19 are generally spaced apart from about 0.060 of an inch to about 0.030 of an inch as illustrated in FIG. 2 at 23. The particular spacing of the propellant surfaces will depend upon the desired burning characteristics of the propellant.

Figure 3:
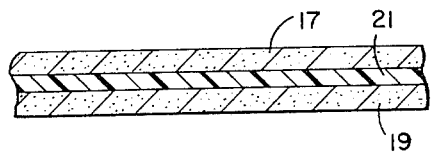
FIG. 3 is a sectional view on an enlarged scale and illustrating the reinforced propellant grain before it is rolled into a carpet roll structure.

The carpet scroll grain as illustrated in FIG. 3 has a uniform web thickness throughout the length thereof and the web thickness may be as small as $0.029 \pm 0.001$ inches and may be as large as a few hundreds of an inch. The thickness of the scroll grain will depend upon the desired burning characteristics of the propellant. For details as to how the propellant is uniformly placed on screen 21, see copending application Ser. No. 103,550, filed Jan. 4, 1971.

Carpet roll type propellant according to this invention is fabricated by taking the scroll grain that has the desired propellant composition on opposite sides of a reinforcing media, cutting the scroll grain to the desired length and width to produce the desired size of propellant carpet roll, curing the scroll grain until the propellant composition has cured, rolling the cured scroll grain about a strip spacer that has the desired diameter, bonding one end of the carpet roll propellant to a head end plate and securing the head end plate into the motor case. By following these method steps, a reinforced propellant of the carpet roll type is formed that has the capability of performing under ultra high burning rates for short duration motors. Also, propellant carpet rolls of this type have the strength to withstand acceleration forces in the 6,000+ g range.

A successful carpet roll type propellant has been made utilizing the fabrication procedures disclosed by applicant and utilizing a scroll grain that had a web thickness of $0.030 \pm 0.001$ inches, a grain width of 9 inches, a grain length of 96 inches and a fiberglass reinforcing material of 14 × 18 mesh with a 0.013 strand diameter. The carpet roll propellant produced had reinforcement throughout the grain length and reinforcement of the propellant was maintained until burnout of the propellant.

Therefore, it can be clearly seen that applicant's invention enables one to adapt a conventional composite or modified double base propellant to thin web grains for short duration motors, to use a low cost propellant with low cost of grain production, to provide grains that can be cartridge loaded thereby eliminating the need for motor hardware for grain production, to utilize propellants that have a low temperature sensitivity ($\pi_k$), to have propellants that are reinforced throughout burning, to have a propellant substrate that has good adhesion, to have a propellant that has high acceleration capability, to have a propellant that has a higher loading density than the state of the art propellant systems, and to have a propellant that has a larger surface to mass ratio.

The particular propellant composition used in forming the carpet roll propellant according to this invention is not critical and may be selected from any of the conventional composite or modified double base type compositions that have the capability of producing the performance desired. That is, any propellant composition that has the appropriate paste type characteristics can be used in the scroll grains before being cured into a thin sheet type propellant that is later rolled into the carpet roll propellant. The composite propellant compositions generally contain an inorganic oxidizer such as ammonium perchlorate, a binder of the rubberized type, a fuel such as powdered aluminum and other additives such as stabilizers and burning rate catalysts, and the modified double base propellants generally contain nitrocellulose, nitroglycerine and the modifiers necessary to produce the desired characteristics of the propellant.

I claim:

1. A carpet roll propellant comprising a propellant composition selected from the group consisting of composite and modified double base propellants, said propellant composition being mounted in a sheet type substrate reinforcing media of fiberglass roving that is spirally oriented throughout said propellant composition in the form of a jelly roll to provide structural support to said propellant composition, said reinforcing media extending the length of said propellant and being evenly spaced between portions of said propellant composition, said propellant composition having oppositely facing surfaces that are spaced apart in said spirally oriented arrangement to define a burning space therebetween for enhancement of the burning characteristics of the propellant composition, and said propellant being secured in a rocket motor case by said propellant having the head end thereof secured to a head end plate by bonding means.

2. A carpet roll propellant as set forth in claim 1 wherein, said oppositely facing surfaces of said propellant composition are spaced apart from about 0.06 of an inch to about 0.03 of an inch.

* * * * *